US012033123B2

(12) United States Patent
Marshall et al.

(10) Patent No.: US 12,033,123 B2
(45) Date of Patent: Jul. 9, 2024

(54) CRYPTOGRAPHIC TECHNOLOGY PLATFORM AND METHODS FOR PROVIDERS TO ENABLE USERS TO MONETIZE THEIR DATA

(71) Applicant: Finco Services, Inc., New York, NY (US)

(72) Inventors: Trevor Marshall, New York, NY (US); Stuart Sopp, New York, NY (US); Aviv Gadot, New York, NY (US); Josh Stephens, Brooklyn, NY (US)

(73) Assignee: Finco Services, Inc., New York, NY (US)

( * ) Notice: Subject to any disclaimer, the term of this patent is extended or adjusted under 35 U.S.C. 154(b) by 472 days.

(21) Appl. No.: 16/424,341

(22) Filed: May 28, 2019

(65) Prior Publication Data

US 2019/0378121 A1   Dec. 12, 2019

Related U.S. Application Data

(60) Provisional application No. 62/768,518, filed on Nov. 16, 2018, provisional application No. 62/676,790, filed on May 25, 2018.

(51) Int. Cl.
*G06Q 20/12* (2012.01)
*G06F 21/60* (2013.01)
(Continued)

(52) U.S. Cl.
CPC ....... *G06Q 20/1235* (2013.01); *G06F 21/602* (2013.01); *G06F 21/6209* (2013.01);
(Continued)

(58) Field of Classification Search
CPC .................. G06Q 20/3829; G06Q 20/1235
See application file for complete search history.

(56) References Cited

U.S. PATENT DOCUMENTS 8,566,952 B1 * 10/2013 Michaels ............ G06F 21/6218
726/30
2009/0164795 A1   6/2009 Justus et al.
(Continued)

FOREIGN PATENT DOCUMENTS

WO   WO-2018-058441   4/2018
WO   WO-2018-100371   6/2018
WO   WO-2018-176140   10/2018

OTHER PUBLICATIONS

International Search Report and Written Opinion issued in connection with PCT/US2019/034214, dated Oct. 7, 2019.
(Continued)

*Primary Examiner* — Jay Huang
(74) *Attorney, Agent, or Firm* — Arnall Golden Gregory LLP

(57) ABSTRACT

In general terms this invention provides embodiment of systems that permit better usage of consumer generated data that permit the consumer methods to monetize the information and maintain control over the data at the time of its creation and at later times. Certain embodiments comprise a user whose interaction can cause a provider to create data regarding the interaction. The user can authenticate the data using encryption aspects and permit the user to self-publish data. The self-publishing can occur in a manner that only requires direct trust of the technology provider regarding the data validity. The invention may incorporate an Ethereum network. Embodiments of the system may verify, exchange, encrypt and decrypt data allowing purchasers to purchase the data or certain portions of it.

27 Claims, 6 Drawing Sheets

(51) Int. Cl.
*G06F 21/62* (2013.01)
*G06Q 20/38* (2012.01)

(52) U.S. Cl.
CPC ....... *G06Q 20/123* (2013.01); *G06Q 20/3827* (2013.01); *G06Q 20/3829* (2013.01)

(56) References Cited

U.S. PATENT DOCUMENTS

| | | |
|---|---|---|
| 2010/0208895 A1 | 8/2010 | Boneh et al. |
| 2012/0106735 A1* | 5/2012 | Fukuda .................. H04L 9/321 380/255 |
| 2012/0191615 A1 | 7/2012 | Schibuk |
| 2015/0332029 A1 | 11/2015 | Coxe et al. |
| 2015/0379510 A1* | 12/2015 | Smith ................ G06Q 20/3829 705/71 |
| 2016/0098723 A1 | 4/2016 | Feeney |
| 2016/0162897 A1 | 6/2016 | Feeney |
| 2017/0289111 A1 | 10/2017 | Voell et al. |
| 2018/0041345 A1 | 2/2018 | Maim |
| 2018/0089885 A1 | 3/2018 | Wald |
| 2018/0343114 A1* | 11/2018 | Ben-Ari .................... H04L 9/06 |
| 2019/0019180 A1 | 1/2019 | Coburn et al. |
| 2019/0035018 A1 | 1/2019 | Nolan et al. |
| 2019/0081789 A1 | 3/2019 | Madisetti et al. |
| 2019/0164157 A1* | 5/2019 | Balaraman ......... G06Q 20/3823 |
| 2019/0228461 A1* | 7/2019 | Domokos .......... G06Q 30/0201 |
| 2019/0237169 A1* | 8/2019 | Culver .................... G06F 9/547 |

OTHER PUBLICATIONS

Bitcoinist, [online], "Opiria And The Pdata Token: Helping You Securely & Privately Monetize Your Personal Data", Apr. 2018. Retrieved from the Internet: <URL: https://bitcoinist.com/opiria-pdata-token-helping-securely-privately-monetize-personal-data/>.

* cited by examiner

CRYPTOGRAPHIC TECHNOLOGY PLATFORM AND METHODS FOR PROVIDERS TO ENABLE USERS TO MONETIZE THEIR DATA

CROSS-REFERENCE TO RELATED APPLICATIONS

This Application claims the benefit of U.S. Provisional Application 62/768,518 filed on Nov. 16, 2018 and U.S. Provisional Application 62/676,790 filed on May 25, 2018. The contents of each are incorporated by reference herein in their entirety.

BACKGROUND

Data generated by users on modern technology platforms is siloed. There is a long-felt need for the use of private databases to store information about user interactions, which allows for the desired performance and security of the system, but before now, there has been no way to bridge that private data to the public in a way that was secure and verifiable.

Data has become incredibly valuable and there is desire to make it purchasable while retaining system security, efficiency, and anonymization. Due to the lack of the proper technology, however, all prior art systems and platforms have resorted to murky, unclear, and untestable methods to negotiate the sale of user data, in whole or in part, to third-party companies. The previous methods are often private and loosely contractual, and are incapable of providing any tangible benefit to the user.

As consumers demand more control over their data, they will be less likely to use technology platforms that do not give them that ability. For the first time, the inventions described herein provide for superior results that use aspects such as distributed ledger technologies like Ethereum and distributed storage technologies like InterPlanetary File System ("IPFS") that can allow for users to publish their data, and receive a clear, defined benefit each time their data is accessed. Prior art systems and methods have failed to achieve the objectives of the instant invention, which are described herein.

Certain aspects of the Ethereum network should be considered. ERC-20 tokens are a cryptocurrency with additional directives. They are digital assets built atop the Ethereum blockchain. Software applications create ERC20 tokens, which function as a digital currency, points in various loyalty programs, and proofs of ownership. Also, ERC-20 tokens can be exchanged for digital coins/other tokens or stored into a personal wallet. The Ethereum Token Standard (also known as ERC20) was developed in late 2015 and is used as a protocol for Ethereum smart contracts. The ERC20 standard defines a common list of rules and functions that an Ethereum token has to implement before performing an Initial Coin Offering (ICO) or a crowdfunding event. A token is simply a representation of ether that has been sent to a smart contract from a particular address. The smart contract keeps track of the sent ether by issuing a token. Every transaction or smart contract executed on the Ethereum blockchain requires gas. Gas is a fraction of an Ethereum token, and is used by the contract to pay the miners securing that transaction on the blockchain for their efforts. Ethereum Gas is a factor of estimating the computational performance of running transactions or smart contracts in the Ethereum network. This method is related to the application of kilowatts (kW) for estimating electricity of the house; the electricity utilized by people isn't estimated in dollars and cents but preferably over kWH or Kilowatts per hour. The price is not demanded by wallets or other assistance providers; rather, it is given to miners for mining blocks of activities and for defending the Ethereum blockchain. This price is given by users to miners and is subtracted from their total transaction value. Ethereum Gas is a unit of measure of the amount of computational effort that it will take to execute certain operations. Gas is what is used to calculate the amount of fees that need to be paid to the network in order to execute an operation. Ethereum events and logs facilitate communication between smart contracts and their user interfaces. In traditional web development, a server response is provided in a callback to the frontend. In Ethereum, when a transaction is mined, smart contracts can emit events and write logs to the blockchain that the frontend can then process. There can be different ways to address events and logs and there are 3 main use cases for events and logs: smart contract return values for the user interface, asynchronous triggers with data, and a cheaper form of storage.

BRIEF SUMMARY OF THE INVENTION

This invention permits consumers to generate data such as from sales activity and yet still control the use of the data. As such, the invention empowers consumers, giving them control over their data at the time of its generation and at subsequent times. This permits them to extract value from the data they generate individually are as part of larger groups of consumers.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention.

DETAILED DESCRIPTION

Figure 1:
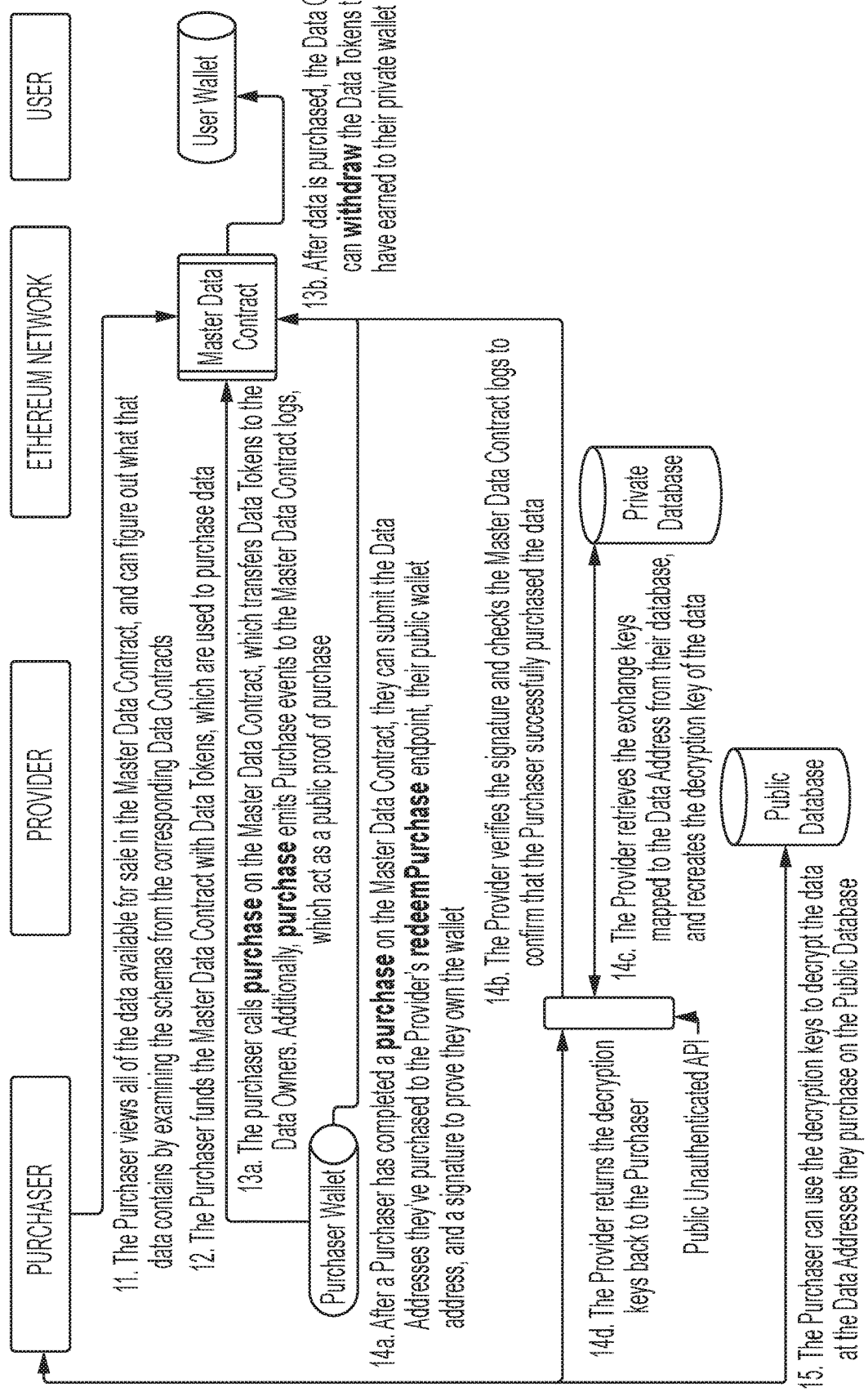
FIG. 1 shows an example of an embodiment where a user publishes data.

Certain embodiments comprise a user, which can interact with the system as described herein and whose interaction can cause a provider to create data regarding that interaction. The user can then authenticate that data in the manner described herein using certain encryption aspects described herein. The systems and methods can allow a user to self-publish data. The self-publishing of data by users can occur in a way that only requires direct trust of the technology provider regarding the data validity, and not of the user. The systems described herein may further comprise an Ethereum network. In general, the ability for anyone on the Ethereum network to incentivize users to submit specific types of data on a provider's network can be provided by the systems and methods described herein. Because of the system's ability to verify, exchange, encrypt, and decrypt data as described herein, superior results can be obtained over systems in the prior art by allowing purchasers to purchase the data or certain portions thereof.

The system can provide the ability for anyone (i.e., any user and/or purchaser) on the Ethereum network to securely purchase user-published data directly from the users that published their data, and the system can cause the purchase to not leak any data into a public network, such as a public portion of the system. Certain embodiments further provide for the ability for the user to make their published data ineligible for future purchases at any time after they publish, giving ultimate control of the data to the user.

As described further herein, the "system" can refer to a "platform" (e.g., a provider platform), or it can refer to a portion or all of an application that a user can download. In some embodiments, the system can comprise a user, a user's interface, an Ethereum network, a provider, a provider's interface, a purchaser, and/or a purchaser's interface. In some embodiments, a user interface, provider interface, and purchaser interface may comprise a software application. In some embodiments that software application might be the same. In some embodiments, a user interface might be the same as a purchaser interface. In some embodiments, a provider interface may be different than a user interface and/or a purchaser interface.

As used herein, the terms "function", "operation", and "protocol" may be used interchangeably and their meaning will be clear to the skilled artisan based on the context in which they are used. In certain embodiments, these terms may refer to execution to certain software functions or the operation of certain algorithms.

As used herein, the terms "submitter", "user", "data owner", "seller", and/or "purchaser" can be used interchangeably. In certain embodiments a "user" may become a "submitter" once the "user" has elected to submit and publish data as described herein. In some embodiments, a "user" is a "data owner." In some embodiments, a "user" can become a "purchaser" depending on the interactions with the platform and any software application. The meaning of these terms will be clear to the skilled artisan based upon the context in which they are used.

Certain embodiments can comprise an Ethereum network. In certain embodiments, an Ethereum network can comprise an open-source, public, blockchain-based distributed computing platform and operating system featuring smart contract (scripting) functionality. As shown, for example, in FIG. 1, an Ethereum network can be configured to interact with other portions of the system while facilitating the secure, encrypted steps shown therein.

Some embodiments may comprise a public database. Some embodiments can comprise a public database that may be content addressable. In some embodiments, a public database may not be content addressable. In certain embodiments, a public database can be an IPFS. An example of a public database may comprise a protocol and network designed to create a content-addressable, peer-to-peer method of storing and sharing hypermedia in a distributed file system. FIG. 1 shows an example of how a public database can integrate and operate within an embodiment of systems described herein. In some embodiments, a public database can comprise a hash table, such as a distributed hash table.

Some embodiments can comprise a provider. A provider can have users that can interact with the provider's platform. The provider's platform can be a standalone application, or it can be integrated into other platforms that allows user access and purchaser access. Certain provider platforms can be created by the provider to provide a facility for its users to publish and sell their data as described herein.

Figure 2:
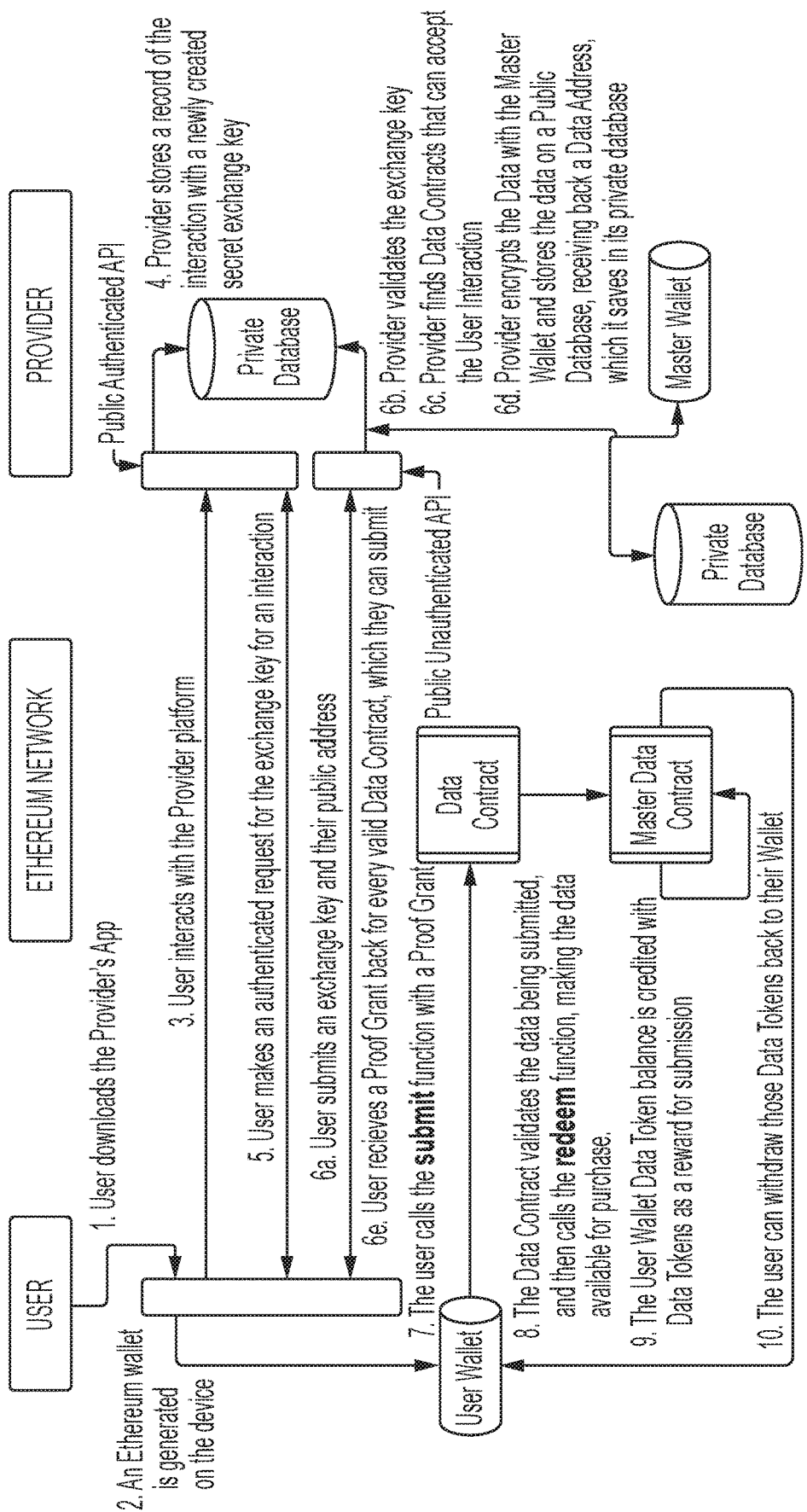
FIG. 2 shows an example of an embodiment where a purchaser buys data.

Certain embodiments can comprise one or more user interactions. A user interaction can comprise an action a user performs on a provider platform. In some embodiments, the user interaction can comprise a user accessing a user interface, wherein the accessing the user interface can comprise interacting with a provider platform. The user can interact with a provider platform by, for example, purchasing a product from the provider or from a third party, wherein the provider stores a record of the interaction and the user can later elect to submit data concerning the interaction, which the user may elect to exchange said data in exchange for data tokens as described further herein. FIG. 1 provides an example of a process flow that shows a particular user interaction and subsequent election to receive data tokens in exchange for submission of data related to that interaction. FIG. 2 shows an example of a process flow whereby a purchaser may then purchase all or a portion of the published data. Some embodiments can enhance the user interaction by permitting additional information to be posted.

Certain embodiments may comprise an exchange key. In some embodiments, an exchange key can be a privately generated universally unique identification (UUID) created by a provider that can map to a user interaction. A UUID can be an identification value that is guaranteed to be unique. In some embodiments, an exchange key can be unique to a single user interaction. In some embodiments, an exchange key can relate to multiple user interactions. In certain embodiments, an exchange key can relate to multiple, related user interactions. FIG. 1 shows an example of an exchange key as it relates to the process flow depicted therein. In some embodiments, a user interaction can include a step of a user making an authenticated request for an exchange key for the user interaction. This authentication can occur as described further herein. A provider may create an exchange key (i.e., a newly created secret exchange key) after a user interaction with a provider platform. A Keccak-256 (SHA-3) hash of the following tightly-packed concatenated string can be used to create an encryption or a decryption key: data contract public address+user's public address+an exchange key. A data contract public address and the user's public address can both be public pieces of information, so possession of the exchange key can mean that an encryption key can be reconstructed. In some embodiments, a decryption key and an encryption key can be the same. In some embodiments, a user's private key may stay the same. In some embodiments, an encryption key comprises a data address.

When a user downloads software application as described herein, an Ethereum wallet (a private key) can be generated on the user's device. In some embodiments, this private key does not change.

Some embodiments can comprise a proof grant. A proof grant can comprise a data address and/or a data signature. A proof grant can be submitted to a data contract in exchange for items of value, e.g., data tokens. Certain embodiments can comprise a data address, which can be a location on a public database where information validated by data contracts can be stored. A data signature can be a signature created by a master wallet using an encryption or hash function as disclosed herein. In some embodiments, the hash function can be the Keccak-256 hash of a submitted data address, a submitting wallet address, and/or a data contract address as described herein.

Certain embodiments can comprise one or more data tokens that can be an incentive for a user to submit data (e.g., to a data contract) and can be the mechanism for a user and/or purchaser to purchase and/or delete data. In certain embodiments, when a user sends a proof grant to a data contract, they can be sent back data tokens as a reward. Data tokens can be held by any Ethereum account. In some embodiments, a data token can be held by a user account, user wallet, or a contract. In some embodiments, data tokens can be unique to a provider, and the value of the data tokens can be determined by the value and/or trust of the information that the provider provides. Because data tokens can be digital assets on an Ethereum network, the data tokens can be exported by users to digital asset exchanges where users can redeem the data tokens for other assets. A provider can also provide a facility by which a user can exchange the data tokens for digital or physical goods on the provider platform.

Some embodiments can comprise a master wallet. A master wallet can comprise a public and/or private key pair. A master wallet can create a master data contract, as well as create signatures that users can provide to grant user access to submit data to data contracts. A master wallet's private key is secured by the provider and used by the provider to interact with a master data contract.

Certain embodiments can comprise a user wallet, which can be a specifically configured Ethereum wallet that is configured to operate with the systems and methods described herein. A user wallet can be stored on a user's device. A user wallet can comprise a private and public key pair. A private key for a user wallet can be generated locally on a user's device, and therefore only the user can create transactions from a user's particular user wallet. A user's device can comprise a computer, mobile device, smartphone, tablet, and the like. The user's device is not particularly limited and would be envisaged by the skilled artisan in view of the disclosure contained herein. A master data contract can interface with any or all data contracts, and can facilitate redemption of valid data addresses for data token rewards, the purchasing of data from data owners, and/or the deletion of purchasable data by data owners.

Certain embodiments can comprise a data contract. A provider may have a provider data network and the provider data network can comprise of one or many data contracts. A data contract can comprise a description, a schema, and/or a data price (which can also be referred to herein as "dataPrice"). Upon execution, a data contract can expose the viewable data, such as the description, schema, and/or data price. A data contract description aspect can comprise a public database address that holds JavaScript Object Notation ("JSON") information about the data contract. JSON information can include the name of a data contract, a description of data comprised by the data contract, images associated with a data contract or other media that can be associated with a data contract (e.g., videos, photographs, advertisements, etc.), or any other information that helps describe the type of data that a data contract can accept. A data contract can be unique to a provider. As a result, a provider can configure the data contained therein, as described herein.

A data contract can comprise a description that can be updated by a master wallet without creating a new data contract. In some embodiments, updating a data contract description can comprise creating a new data contract. A data contract schema can comprise a public database address that can hold JSON information about the type of data that the data contract accepts. In some embodiments, schema for a data contract cannot be changed after the data contract has been created. A data contract can comprise a data price. A data price can be the price in data tokens that must be paid for each decryption key of a data address that has been submitted to a data contract. A data price can be dynamically adjusted based on demand for the data, or other mechanisms built into the data contract.

Executing a data contract can expose functions such as a submit function, an updateDescription function, and/or an updateDataPrice function. A submit function can verify that any data being submitted has been created by a provider and is able to be verified by a related data contract. A submit function can call a master data contract redeem function once a submission has been verified, e.g., by the submit function. An updateDescription function can only be called by the master wallet and can update a public data address that contains a description of a data contract. An updateDataPrice function can only be called by the Master Wallet, can update the data price for data submitted to this contract, and may be substituted with a public auction function in future versions of data contracts.

In certain embodiments, executing a master data contract can expose certain viewable data. A master data contract can comprise directory data, balance data, dataOwners data, redeemed Data data, dataAdressToDataContract data, dataAddressToAwardAmount data, and/or purchase data. Directory data can comprise an array of all the Data Contract addresses within the provider data network. Balance data can comprise a mapping of wallet addresses (e.g., contract accounts and external accounts). Some embodiments can comprise one or more external accounts and one or more contract accounts. An external account can be controlled by pairs of a user's private key and a public key, such as an exchange key and/or a public wallet address. A contract account can be controlled by contract code that can be executed. In certain embodiments, a contract account can be controlled by code that is stored together with the contract account. In some embodiments, balance data can comprise a data token balance that has been funded in a master data contract. User data (which can be referred to herein as "dataOwner data" and those terms can be used interchangeably) can comprise a mapping of data addresses. In some embodiments, dataOwner data can comprise data owner addresses (e.g., external wallet addresses of users that have redeemed data on a master data contract). Redeemed Data data can comprise an array of any and all data addresses that have been redeemed and are available for purchase. DataAddressToDataContract data can comprise a mapping of data addresses. In some embodiments, DataAddressToDataContract data can comprise data contracts to allow purchasers to know the schema and price of any data contained in a master data contract. DataAddressToAwardAmount data can comprise a mapping of data addresses. In some embodiments, DataAddressToAwardAmount data can comprise award amounts, which can be configured to show how much a data owner was awarded for submitting their data (e.g., data price). Purchase data can comprise a mapping of transaction identification data (e.g. public wallet addresses of purchasers mapped to data purchased by a user and an Ethereum transaction identification of their purchase). In some embodiments, purchase data can comprise a purchaser address or addresses for every successful purchase of data. In some embodiments, a distributed ledger can be created containing information about a user such as numerical identification numbers assigned to a user and/or a purchaser; or other identifying information such as name, address, IP address, location, etc.).

As used herein, a user can be a purchaser and/or a data owner. In some embodiments, a data owner is a user that published data. In certain embodiments, a user can be a prospective purchaser. In some embodiments, a purchaser is a user that purchased data by purchasing a decryption key to a data address that was published by a data owner.

A master data contract can expose a deposit function, a withdraw function, a redeem function, an addReward function, a calculateDataTokenAward function, a purchase function, a getPurchaseStub function, and/or a createDataContract function. A deposit function can let a user fund a master data contract with data tokens the user can use to purchase data or add rewards to one or more data contracts. A withdraw function can let users withdraw their data token balance to an external account (e.g., back to the user's user wallet). A redeem function can be called by one or more data contracts, can calculate an award for a given data address, and can credit the balance of a data owner by the award amount, can establish mappings required for a Purchaser to buy a decryption key, and/or notify any watchers (i.e., potential purchasers) that new data is available for sale. An addReward function can let a user transfer part of the user's data token balance to a data contract balance, incentivizing users to submit data to a data contract. A calculateDataTokenAward function can be a private method that may only be called within a master data contract and can determine a quantity of data tokens to be transferred from a data contract data token balance to a data owner (e.g., purchaser) data token balance on a successful redeem function of a data address. In some embodiments, a purchase function can only be called by a master wallet, can transfer a data token balance from a purchaser address to a data owner address, and/or a transaction identification of a successful purchase function call can be added to purchase mapping, so that the purchaser can get any data from the provider at any point in the future. After being given a list of data addresses a purchaser wishes to purchase, the getPurchaseStub function can compute any additional data token cost. A createDataContract function can be called by a master wallet, and can create a data contract on an Ethereum network that is within the provider's data network, and can store the new data contract address in a directories array of the master data contract.

Anyone with an Ethereum wallet (e.g., a user wallet, master wallet, or purchaser wallet as described herein) can purchase data from a master data contract. Any purchaser can fund the master data contract with one or more data tokens, and can then redeem those tokens for decryption keys via a private call to a provider's application programming interface (API). A purchaser can be considered synonymous with a public Ethereum address that has funded the corresponding master data contract. In some embodiments, a provider's API can be open-source and auditable.

Some embodiments can comprise a method of encrypting and decrypting data, using aspects such as exchange keys, so that a user can publish data and make it available for sale. Certain embodiments can comprise methods that comprise a publish step and a purchase step. An example of steps that such a method can comprise is as follows:

An example of an embodiment where a user can publish data:

1. A user downloads a provider's application to a user device and creates an account.
2. An Ethereum wallet can be generated on the user device.
3. The provider application on the user's device creates a unique private key.
4. The private key may be held only by the user's device and can be secured.
5. The provider application can create an access point to interact with a provider platform.
6. The user can interact with the provider platform.
7. The user interaction can be stored in a private database owned, or otherwise controlled by a provider, wherein the provider can manage the provider platform.
8. A provider can create an exchange key associated with the user's interaction.
9. An interaction object can be stored with the exchange key, which can be unique and randomly generated.
10. This exchange key can be made available to the user via a provider's secure, authenticated API.
11. The user can submit the exchange key in conjunction with a public Ethereum wallet address (e.g., the user wallet) to a provider's publish function in exchange for an array of proof grants that each contain information about which data contracts to which the proof grants can be submitted.
12. The user can submit the proof grant to the one or more data contracts using a data contract submit function.
13. The data contract submit function can trigger a redeem function on the master data contract, and the user can get a data token reward of a predetermined amount for submitting the user data.
14. Once the data address has been redeemed, it becomes eligible for purchase. All data that is available for purchase can be in a redeemedData array of the master data contract, which can be viewed publicly. Descriptions about the data addresses in redeemedData can be viewed by prospective purchasers reading the information from the associated data contracts.
15. The user can withdraw the data tokens they earned from the data submission, wherein the withdrawal can be from the master data contract.

An example of an embodiment where a purchaser can further buy the published data from users:

16. A purchaser can determine what data they want to purchase by examining the schemas of the corresponding data contracts for any data address available for purchase in the redeemedData array.
17. Data can be purchased individually or in blocks at a time. A purchaser can fund the master data contract with funds sufficient for the data they wish to purchase (e.g., the data price) and can further purchase a stub amount (e.g., any additional data cost beyond the data price). Deposits can be achieved by transferring one or more data tokens to the master data contract address through an ERC20 transfer functionality. In some embodiments, a deposit can be achieved through an ERC223 transfer functionality.
18. The purchaser can then call a purchase function on the master data contract. This function can transfer data token balances from the purchaser to the one or more data owners of each of the corresponding data addresses purchased after the purchaser calls the purchase function. In some embodiments, a purchaser submits the purchaser public wallet address, and/or a purchaser signature to verify the purchaser owns the purchaser wallet.

19. The provider can call a redeemPurchase function on the provider API. The redeemPurchase function can verify the purchaser signature and check the master data contract logs to confirm that the purchaser successfully purchased the data. The provider can retrieve the exchange key mapped to the data address from the provider database. The provider can recreate a decryption key of the data and return the decryption key of purchased data to the purchaser.

20. The purchaser can use the decryption keys to decrypt the data available in the corresponding data addresses.

An example of an embodiment where a user can further unpublish their data and make it unavailable for future purchasing:

21. A user may choose to delete any or all of the data the user submitted to the one or more data contracts from the master data contract. Only the user that created the data can delete it, and they must pay back the data token reward (e.g., the data price at the time the user data was purchased by a purchaser) they received when they posted their data. In some embodiments, a user may delete published data the user submitted without paying back a data token reward if the data was not decrypted or purchased by a purchaser.

The security and privacy aspects of the systems and methods described herein can be ensured with the use of hash functions. In general, a hash function can be any function that can be used to map data of arbitrary size to data of fixed size. A cryptographic hash function allows one to verify that some input data maps to a given hash value, but if the input data is unknown, it is deliberately difficult to reconstruct it (or equivalent alternatives) by knowing the stored hash value. Embodiments described herein can use hash algorithms such as SHA-1, SHA-2, SHA-3, keccak-256, and/or SHA-256. In some instances, those terms can be used interchangeably depending on the context in which they are used but their meaning would be clear to the skilled artisan. A hash function can be a cryptographic hash function. A private database can comprise a hash table. A hash table can be a self-referential table.

Embodiments described herein can use hashes as a proof grant for purchasers and owners of data. Due to the nature of hash functions being "one-way", no user can impersonate a purchaser or owner of data to cheat the system and steal data tokens or publish false data addresses. As a result, the embodiments described herein produce superior results and an outcome unachievable by prior inventions. This is, in part, because of the unconventional combination of steps and components described herein, along with the combination of elements described in the various embodiments described herein.

Keccak-256 (the algorithm of SHA-3) can be chosen as the algorithm to power signatures of embodiments described herein. It can produce superior results in these embodiments because it can be a native method that Ethereum contracts can run. An Ethereum contract can call keccak-256 on any inputs of bytes to produce a hash. This computation can run in the Ethereum Virtual Machine (EVM) without any supplemental functions. In some embodiments, an EVM can comprise and operate the Ethereum network. Keccak-256 uses a method called "sponge construction", which adds significant entropy to the hashing process to increase security. Some embodiments can comprise sponge construction.

Distributed ledgers can enable uncoordinated parties (e.g., users and purchasers in the systems and methods described herein) to synchronize data. In some embodiments synchronization of data occurs to execute data contracts. Embodiments comprising an Ethererum network, can have the Ethereum act as a distributed ledger that can contain smart contracts. In some embodiments, smart contracts can be small pieces of code that can be run by anyone on the network. On Ethereum networks described herein, smart contracts can be written in a language called Solidity. On an Ethereum network, transactions can be created to these contracts that include instructions to run a Solidity function. Data contracts and master data contracts described herein can be smart contracts.

When a function is run in a smart contract, the contract can be made aware of the identity (the public address) of a user that is calling it. This mechanic can enable one or more users to interact with one or more smart contracts in way that can be verifiably tied to the one or more users' identity, because only the owner of the public address (ownership meaning the possession of the corresponding private key) can create the transaction in the first place, which can contribute to the production of the superior results and outcomes described herein.

In some embodiments this principle can be extended so, certain functions can only be called by certain users. In certain embodiments, only a master wallet can interact with a corresponding master data contract to publish one or more new data contracts and create proof grants for users to submit data addresses to data contracts. With this level of verification, any users of the system can be sure that any data made available for sale was created and verified by the corresponding provider, thus ensuring a verified, secure source.

This identity awareness can also facilitate deposit and withdraw functions on a master data contract so that the master data contract can verifiably maintain a ledger (e.g., a distributed ledger) of one or more data token balances. For example, if User X, with public address X_Address, wants to withdraw one or more data tokens stored in data token balances mapping, User X can only do so by creating a transaction signed by the appropriate private key for X_Address.

Some embodiments can comprise a provider API. Unlike methods of the prior art, such as contract methods, functions on a provider API can be superiorly private for the aspects of the embodiments described herein. For instance, in certain embodiments, only the function caller (e.g., the user) sees the results of the call. In some embodiments, a publish can be an unauthenticated API endpoint that accepts a public address and an exchange key. Some or all exchange keys can be mapped to a unique user interaction on a provider's platform. Users can receive exchange keys through authenticated functions on the provider API. In certain embodiments, possession of a valid exchange key can be all that is required to publish data.

Authenticated API calls can be made by users of a provider's API who have an account on the provider's platform. As used herein, to be "authenticated" is intended to include credentials on requests made to the API that prove the user's identity within the context of the provider's platform. For example, an authenticated request to a provider's API for a user to change their own name would include credentials in the request that would allow the provider to verify the user's identity, ensuring that the request is valid, and that the user has access to make the change.

As used herein, "unauthenticated" requests to an API can be considered to be requests that provide no credentials that the provider can use to know the identity of a user. An example of this is when a user logs in to a provider's platform. On many platforms, a user may provide an email and password to a provider's API, and the provider may return the credentials to the user that can be used for authenticated requests. In other words, authenticated requests can only be made by users with accounts on a provider's platform, while unauthenticated requests can be made by anyone.

In some embodiments, a user can publish the user's public wallet address and an exchange key associated with a user interaction. A provider can verify the exchange key, and determine one or more data contracts that can accept this information, based on the data contract's data type and schema requirements. A valid data address can be created after the exchange key verification.

For each valid data contract:
1. The provider can create a JSON object string, which can be in the shape of the data contract schema.
2. The provider can encrypt the JSON object string with an encryption key that can be a string that is constructed by retrieving a Keccak-256 (SHA-3) hash of a tightly-packed concatenated string, such as the following:
   a. Data Contract public address+the user's public address+the unique exchange key.
3. The provider can upload the encrypted JSON object string to a public database such as an IPFS. The public database can be content-addressed, and by posting the JSON object string, the provider can receive back a hash that can act as a data address of the information contained in a data contract.
4. The data address can be stored in the provider's private database with this encryption key so that it can be delivered to purchasers as a decryption key.
5. The provider can create a signature using the master wallet private key of the Keccak-256 hash of the following tightly-packed concatenated string:
   a. Data contract public address+the user's public address+the data address.
6. The submit function on a data contract requires this data signature to ensure that the data address being submitted to it is valid and created by the provider.

In some embodiments, for a user to successfully submit the user's data to a data contract, they may require a proof grant. A proof grant can comprise a data address and/or a data signature.

A publish function can return an array of proof grant and data contract address pairs to the user. The user can determine which data contracts to which the user would like to submit to by examining the description and schema of the data contract addresses. In certain embodiments, the user can only submit one or more proof grants from the user wallet they submitted to the publish endpoint, since this is the public address that the provider has used to create the data signature.

In certain embodiments, a redeemPurchase function can be called after a successful purchase has occurred on a master data contract. The redeemPurchase function can provide the decryption keys to a purchaser for data addresses that the purchaser has purchased. A purchaser can provide the purchaser public wallet address to a redeemPurchase function endpoint, along with a list of data addresses, and a signature of the Keccak-256 hash of any provided list of data addresses. The provider can verify the purchaser signature to ensure that the provided purchaser public wallet address belongs to the requester of the purchased decryption keys as an authentication step. The Provider then checks the Master Data Contract logs for each of the provided Data Addresses, and ensures that this Purchaser has purchased this data. The provider can connect to the provider's private database and return the decryption keys for each provided data address. The purchaser can decrypt the data located at the data address and store it on their own system in any format they choose. In some embodiments, the provider may also be a purchaser. In some embodiments, a purchaser and provider may be separate entities.

Certain embodiments can comprise a data contract. Methods comprising one or more data contracts can be external operations made available to users on an Ethereum network within the data contract code.

Certain embodiments can comprise a submit function. One or more submit functions can be called by a user with one or more data addresses and/or one or more data signatures. The purpose of this function can be to ensure that the user is the owner of the user data, and that a master wallet can verify that the user data can be submitted to the associated data contract. In some embodiments, a user sends a transaction to the data contract with the inputs of a data address, and a data signature.

In some embodiments, the data contract can ensure that a signature is valid and created by a master wallet. This validation operation can be checked by getting a Keccak-256 hash of the tightly-packed concatenation of the data contract public address, the data submitter's public address (i.e., the user submitting data), along with the user-submitted data address. In some embodiments, an Ethereum network can have an ECRecover method, that can be native to an Ethereum Virtual Machine (EVM), and that can ensure that a provided data signature was created by the master wallet on the associated hash. In embodiments where a data contract has ensured validity, the data contract can check a dataAddressToDataContract mapping function on the master data contract to ensure that the associated data address hasn't previously been redeemed. If both the ECRecover method and dataAddressToDataContract checks pass, the data contract calls redeem on the Master Data Contract. If a mapping exists for this data address, the data has already been redeemed. If the mapping attempts to retrieve an already-redeemed data address, the purchaser may receive a message indicating as much. In other embodiments, a user may submit a single parcel of data, which may not be replicable.

In some embodiments, a master data contract can be a group of functions that can be called by one or more users on an Ethereum network and can be made available within the contract code, such as those disclosed herein.

Certain embodiments can comprise a redeem function. Certain embodiments can comprise a directory array of a master data contract. A redeem function can be called by data contracts that exist in a data network. A data network can be a directory array of a master data contract. The redeem function can accept a data address and a data owner address (e.g., a user that called a submit function on a data contract). The redeem function's responsibilities can be to update mappings in a master data contract to inform the public that new data is available, and what that new data contains.

In some embodiments, a calculateDataTokenReward function can be a private operation and can be called to determine an award amount of data tokens to be transferred from a data contract data token balance to a submitter's (i.e., user selling data) data token balance based upon the data price amount. A data contract data token balance can be debited by an award amount and the data owner's data token balance is credited by the same amount. The award amount can be zero, in which case nothing is transferred.

In some embodiments, the following mappings can be created:
 a. dataOwners function can map a data address to a data owner
   i. A dataOwners function can designate a submitter's wallet address as the owner of the data, which can enable the submitter (i.e., the user) to be paid in data tokens for purchases of the data.
   ii. dataAddressToDataContract function can map a data address to a data contract and can designate the calling data contract as the proper type of data for the submitted data address.
   iii. dataAddressToAwardAmount function can map a data address to an award amount and can designate an award amount (in data tokens based on a data price) paid for the submission of the particular data address. A dataAddressToAwardAmount function can be used as the price for the data owner to delete the data address from a master data contract in the future upon a decision to delete that data. In some embodiments, the data price can fluctuate over time while the redemption data amount (i.e., the dataAddressToAwardAmount) can remain constant. In some embodiments, the user that sold the data may retain a constant price to later delete data that has been submitted.

In certain embodiments, a data address can be pushed into a global redeemedData array with all of the data addresses that are available for sale.

Certain embodiments can comprise a withdraw function. In some embodiments, users can remove tokens from a master data contract by calling a withdraw function. A withdraw function can be called with a desired withdraw amount, which can specify a quantity of data tokens the user wants to withdraw.

A withdraw function can comprise any or all of the following elements:
 1. The withdraw function can check that a calling wallet address (e.g., the wallet address of a user that has decided to purchase data for a specified data price) has sufficient balance, which is stored in a balances mapping function of a contract;
 2. If a user has sufficient funds in a data contract, the withdraw function can create a transfer of the requested data tokens to the calling wallet (e.g., the wallet address of a purchaser that has decided to purchase data for a specified data price); and/or
 3. If the transfer is successful, the withdraw function can update balances with the calling wallet's updated balance by debiting the withdraw amount to the user.

In some embodiments, a withdraw amount can be a data price that was determined at the time the user submitted the data or a later data price that has varied from the initial data price. In some embodiments, the withdraw amount can be a dataAddressToAwardAmount. In some embodiments, a data price can be determined at the time data is sold. The data price of that data may fluctuate over time. After data is available for purchase, the data price may change. A data asset (e.g., a data token) does not have to be Ethereum. A data asset can be a digital benefit granted by a provider. In some embodiments, this grant can be to a user after a user has satisfied certain criteria in a user interaction.

In certain embodiments, a purchaser can buy an array of data addresses. Because the length of the data address array may not be capped, there can be extra protection to ensure that the purchaser has provided sufficient gas (as that term would be understood by the skilled artisan within the context of an Ethereum network) with the transaction to complete it.

For each data address that is requested, a purchase function can determine if a data address is valid and available for purchase and a data price of the data address. If a purchase function determines that criteria is satisfied, the purchase function can then check if a stub amount is payable back to a master wallet's data token balance by using a getPurchaseStub function. In some embodiments, a purchase function can confirm that a purchaser has a sufficient data token balance to pay all of the data prices and the purchase stub amount. In certain embodiments, a purchase function can also confirm that a transaction has sufficient gas remaining to enact all of the necessary state changes for completing the activated purchases.

In some embodiments, for each data address:
 a. The data price can be debited from a purchaser balance;
 b. The data price can be credited to a data owner balance; and/or
 c. A data purchased event can be emitted and can include a purchaser's wallet identification along with the data address the purchaser purchased. This can also create a public log of the data purchase event. This public log can be referenced by a provider as a receipt of sale to confirm the purchase during a redeem Purchase function.

A purchase stub can be debited from a purchaser's data token balance and can be credited to a master wallet's data token balance, and the purchase may be complete.

A user can have the ability to unpublish a data address that the user had previously published. Although unpublishing may not remove any encrypted data from a provider's public database, and may not revoke unencrypted data that has already been purchased, it can prevent future purchasers from being able to purchase decryption keys for that data (e.g., the unpublished data), and can remove any guarantee by the provider that information created at this address is valid. In some embodiments, information about a purchase event (e.g., a purchaser buying redeemed data) may remain intact so that prior purchaser retain the confidence that the information created at that address was valid. In some embodiments, the user must have data token balances in a master data contract sufficient to repay an award amount, which can be returned to a data contract data token balance. An unpublish function can remove a data address that the user wishes to remove.

In some embodiments, an unpublish function can check a dataOwners function to ensure that the caller of the function is a proper and verified data owner. In some embodiments, an unpublish function can check a dataAddressToAwardAmount to find the original award amount paid to a user, and can further ensure that the user has a sufficient data token balance in a master data contract to cover the repayment.

In certain embodiments, an unpublish function can comprise some or all of the following steps:
 1. An unpublish function can remove the following from a master data contract
   a. The data address from a redeemed Data array;
   b. The data address from data owner mapping;
   c. The data address from data contract mapping; and/or
   d. The data address from award amount mapping.

2. A data owner's data token balance can be debited the award amount, and the award amount can be credited to the data contract's data token balance.

In some embodiments, a user can verify or enhance a purchase in multiple manners on Current. Including such information as the location of the purchase, the time, the cost of the purchased item, can all enrich the experience of a Current user or tracker. An exemplary form of one of these embodiment could be illuminated in the purchase of a new pair of Nike shoes. The purchaser finally decides on a specific set of shoes, perhaps new black and red Jordan 1's, and the transaction is performed using a Current card for the purchase. One manner to verify that the purchaser did indeed buy this fresh pair of shoes is by giving the purchaser the opportunity to share more information publicly in Current. After the purchaser swipes her card, she can be provided a push notification asking her to take a picture of said shoes in real time or from their library using a native photo selector or provide other useful information. That picture can be attached to the receipt of the purchase, and can be seen by individuals who know the purchaser or who have signed up to follow her. A filter can also be added to the picture to customize it before posting. By using the Visa merchant string and the purchasers' location from the Current app, Current is also able to add the Brand (Nike) and the general (city) or specific (street or website) location. Once the content is attached to the transaction from any network, it could be placed on the Current platform or encoded into a public blockchain. In this example the receipt is thereby turned into a fully verified document of the purchase of a specific pair of Jordan 1's at Nike in NYC. Non purchase related data—such as comments or reactions—can also be added to the posting. The ability to post such social proof of a purchase made on a network connected to Current's transaction ledger can assist in driving future purchasers. The purchaser also can to earn points when she purchases, giving her even more reason to share.

The mechanism to attach a photo to a transaction can be very helpful in developing and curating brand and discovery feed. When a user makes a purchase, their bank keeps a record of their transaction. This record often is viewable in their banking app, but usually the user is only able to see an amount and an un-useful string of numbers and/or characters. This information is not easily shareable. One embodiment of the invention is to make those receipts sharable, and optionally to share additional content that enriches or simplifies the transaction for searching. The information that is posted about the transaction will be viewable by others, and the user is subsequently rewarded with points either when the posting is complete or when others have viewed the information or both. In certain embodiments, the more information added the more points that are earned. Some, but not all examples of information that you can add are: one or more pictures of what was bought, pictures showing actual use, a picture of the receipt, location information about what store or website was used, and SKU level information about what was bought. The receipt level information can be added manually or captured by an OCR (Optical Character Recognition) Application. The SKU information could preferably be confirmed against an ISBN database to cross—check the transaction. Other people could then view the transaction after it's posting. In such a manner additional points could be earned when other people like or comment on it. In some embodiments the post could also be published to a public blockchain, and when people purchase the data, the user could be further rewarded for their post, adding additional incentive to post content about their purchase.

Figure 3:
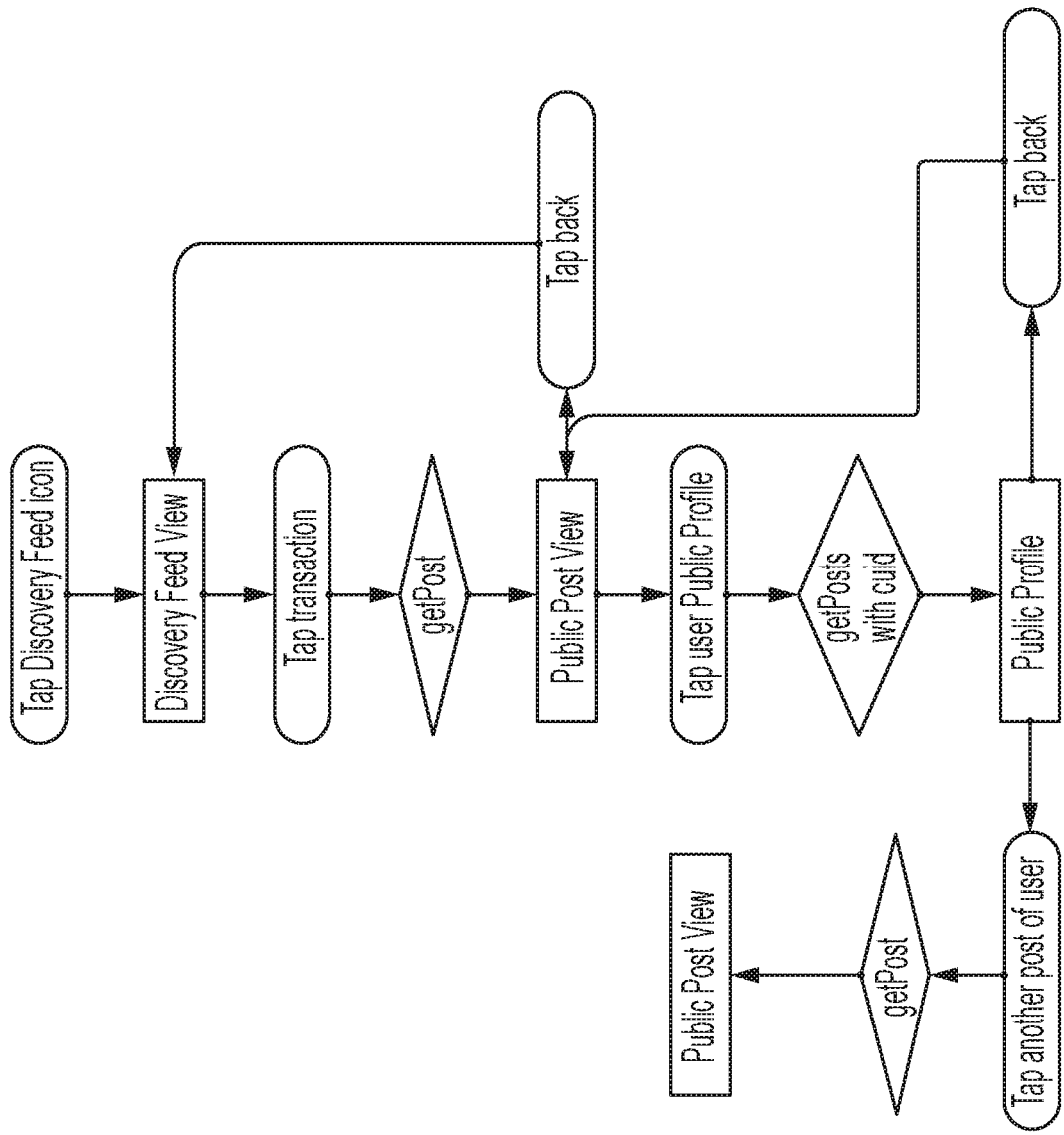
FIG. 3 shows an example of a flow diagram for one form of Public Posts. This exemplifies one way a user can tap into other transaction items in the discovery feed to see others' posts using the discovery feed.

In some embodiments users can tap into transaction items in the discovery feed to see posts and other users' public profiles by browsing the discovery feed. An exemplary flow diagram of such a process is found in FIG. 3.

Spec: Post-Composition

Description: Users can take a picture of what they bought and share it to the brand feed.

The user can be prompted to post in a number of ways. Including, but not limited, to the user seeing a push notification after a purchase, which prompts the user to share a picture. When the notification is tapped, it opens the Post. Alternatively, when the user opens Current, they see a badge on the user's notifications and when the Notifications are clicked, they see an item prompting the sharing of a picture. When the notification is clicked, it can open into a Private Post View. A further alternative is when the user opens a wallet they can see a list of all recent transactions on a click on one of those transactions can open a Private Post View. A user can see the Private Post View and post it by uploading a photo from a photo library, preferably cropping the photo screen and—after the user confirmation, taps post. Alternatively, the user can actually take the picture, crop it and post the material. All of this also permits the brand to monitor the quality and look of its product, in real time, if preferred.

Figure 4:
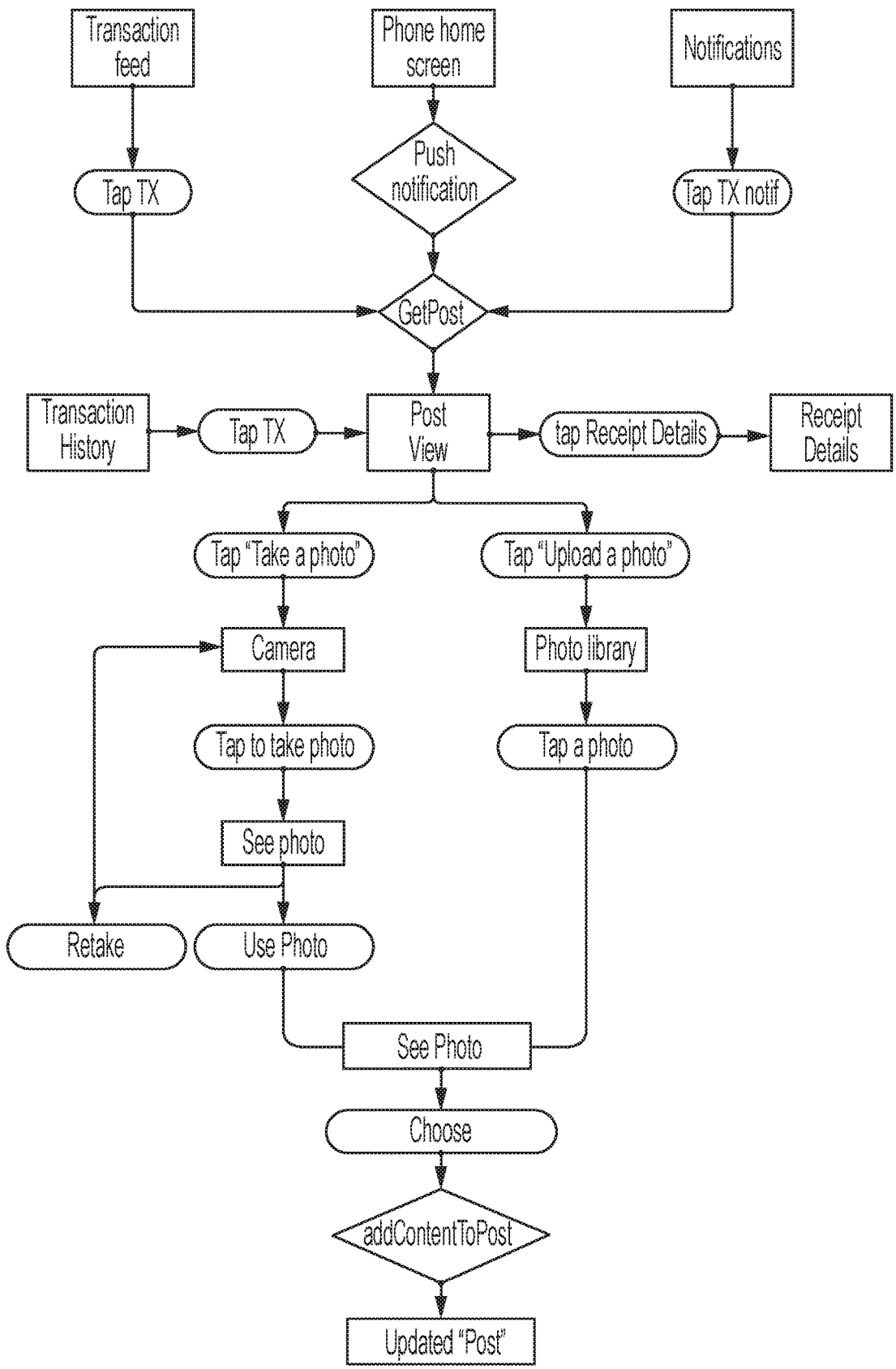
FIG. 4 shows an example of a flow diagram for one form of transaction notifications involving photos. This shows how the viewing can be limited to subgroups of the public posting. This exemplary flow diagram shows the user flow for public and private postings and combinations thereof.

There are two primary types of view for the Post, but the viewing can be limited to subgroups of the public posting. The two primary postings are public and private. (1) Public: the user viewing someone else's post regarding Brand, Merchant, User, Image, etc. or (2) Private: viewing the user's own post which entails all of the above plus the amount an exemplary flow diagram of such user flow is set as FIG. 4.

Figure 5:
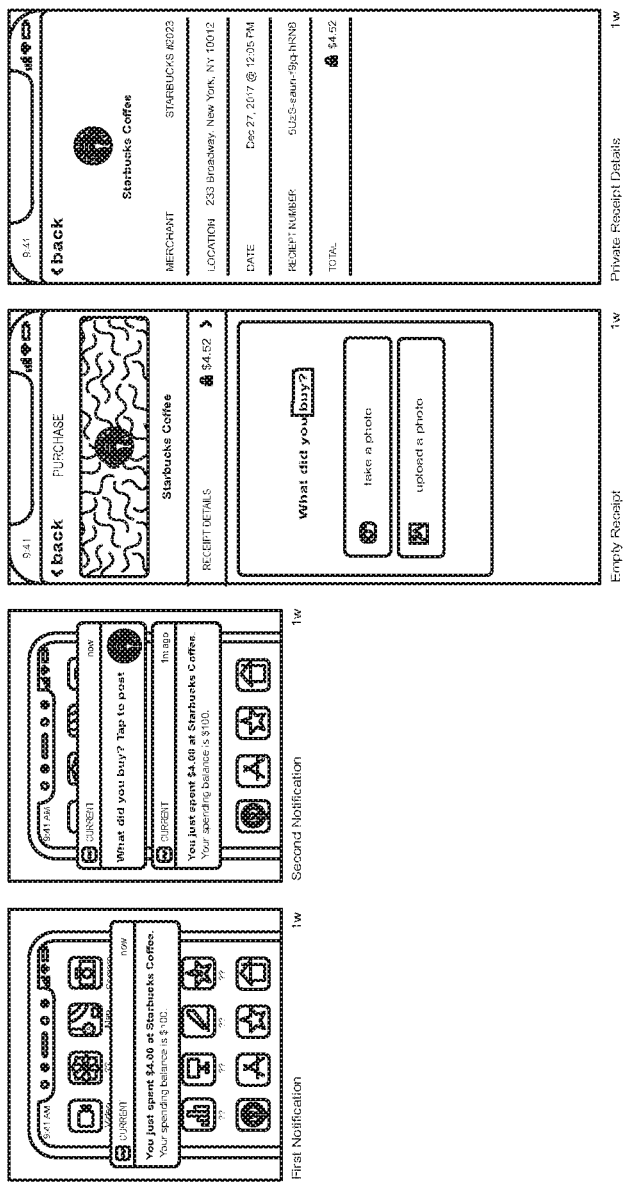
FIG. 5 shows an example of an embodiment for mobile phone input of a purchase.
Figure 6:
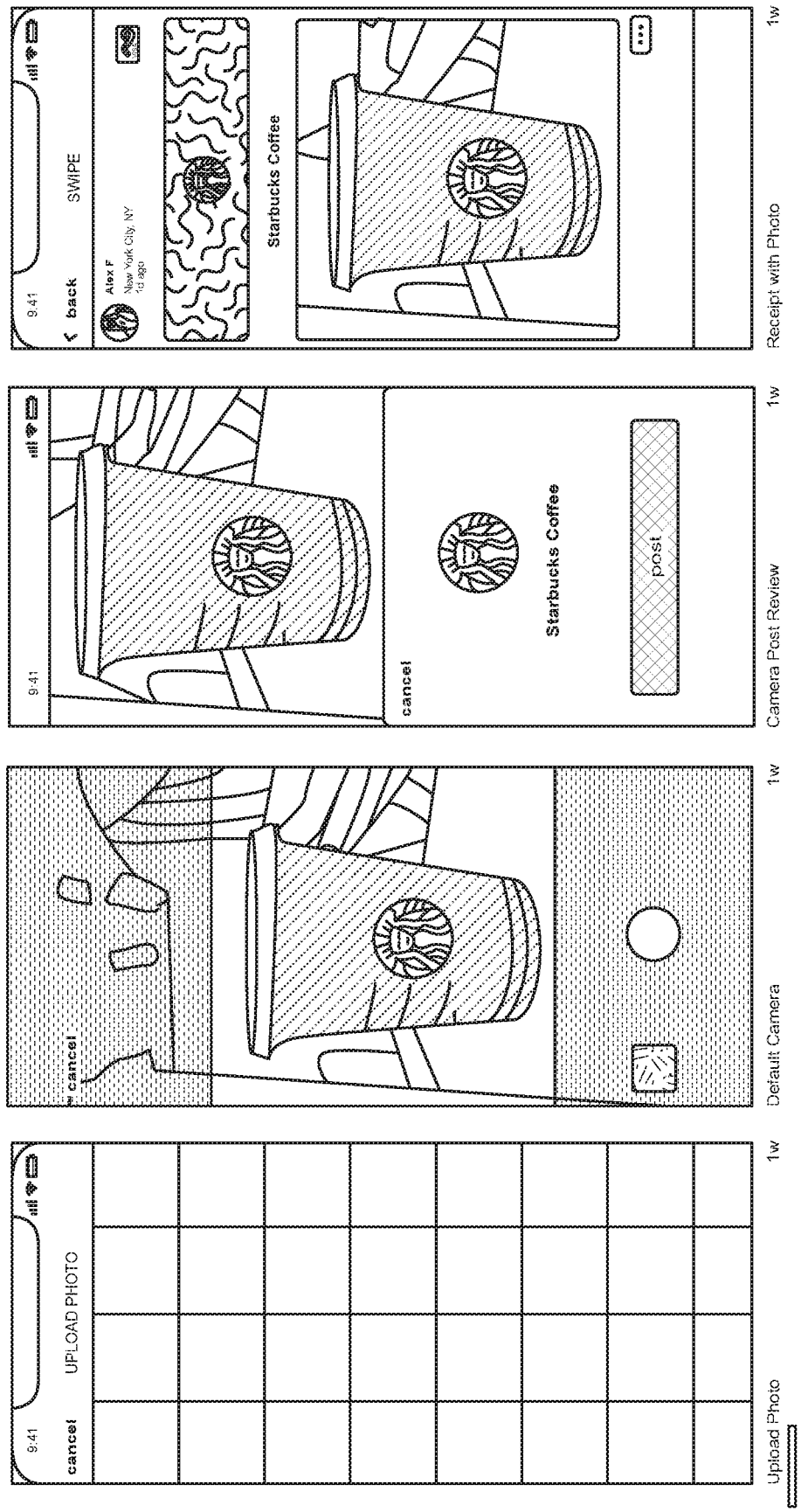
FIG. 6 shows an example of an embodiment for mobile phone input of a purchase involving a picture of the purchased item.

All of this taken together could form a transaction as set forth in FIGS. 5 and 6.

Certain embodiments can comprise a unique point system platform. In such an embodiment, each point can be referred to as a "PIP." A PIP can be a unit of cryptocurrency (which in some embodiments a PIP can be equivalent to a data token). PIP stands for "proof in purchase", which is an aspect of a platform described herein that achieves superior results over that which is in the prior art. PIPS can be bought, sold, and used as an incentive by providers such as individuals, brands, and organizations. In some embodiments, one or more PIPs can be used as incentives in a closed system.

For example, an embodiment could set an arbitrary value of $0.02 to each PIP, although this value is not particularly limited unless specified otherwise. It may not be necessary to assign an initial value a PIP at this time.

In certain embodiments, users can earn points by sharing information and completing tasks. PIPs can allow users to monetize their data and information and share transactional data that can be purchased using the systems and methods described herein.

In some embodiments, users can earn PIPs by providing basic demographic data, including their age and gender; sharing interests and activities in a personal profile; identifying and linking their social media accounts; referring friends to a provider; purchasing; adding SKU-level transaction detail about a transaction or other further detailed information; confirming a user's transaction location (e.g., specific merchant and location). In some embodiments, users can also earn PIPs by responding to specific brand incentives, such as making purchases at certain times, interacting with a provider platform at certain times, or making purchases or other transactions that reach a certain threshold (e.g., price).

As users accumulate PIPs they can save them, gift them, and/or convert them into money. Such processes can be governed by the encryption methods described herein. PIPs can be held by users and can be stored in a client-side wallet (e.g., user wallet) that can be installed on the user's mobile device when the user create an account on the applications described herein.

Brands can obtain PIPs by purchasing them from a PIP distributor, such as Current, through a desktop portal. Brands can use purchased PIPs as incentives to reward a wide variety of user activity. The number of PIPs awarded for each action can be defined by the brand. For example, brands can incentivize foot traffic to specific stores or events; transactions at stores and/or online; answering quizzes or surveys; and/or referrals and influencers activity (social shares, referrals, etc.). These interactions can be paid for with PIPs using the mechanisms described herein.

Organizations, potentially including brands, marketing agencies, and research firms, can also buy PIPs and exchange them in to build user cohorts. Cohorts can be comprised of users who meet the organization's desired data profile (potentially including age, gender, location, and specific transaction behavior). Cohort data can be aggregated, protecting user privacy. Cohort data can be encrypted and decrypted using the mechanisms and processes described herein. In some embodiments, aggregated cohort data can be purchased for a data price as described herein. Each user inside the cohort can be rewarded with PIPs as soon as the cohort is created or a user can later be rewarded with PIPs upon satisfaction of a separate triggering event (such as the purchase of the cohort's data). In this manner user have monetized their own data, but they can do so as part of an aggregated set of data.

Once a cohort is built, organizations can use the data as input for marketing research, and they can push specific offers directly to the cohort members. The embodiments described herein produce new and superior results than systems in the prior art in this regard: the systems and methods described herein allow for a secure, authenticate management of data by a user or group of users as a cohort, which allows a user to securely monetize their data.

The potential brand uses for the PIPs point system platform are varied. The constant is that individual users can be rewarded in PIPs, although users can earn data tokens for transactions as described herein. To illustrate how the platform can work a number of potential scenarios are described in the examples below.

Current is a provider that currently offers a debit card service to US residents. Users can sign up and order physical debit cards that are shipped to their home. After users have activated and funded the cards, the cards can be used to purchase items in physical locations or online. Through the financial networks that Current is connected to, as well as it's enriched merchant database, Current can generate a lot of data for a user whenever they spend with their card.

Using the embodiments described herein, Current and other providers can enable their users to sell their purchase data to data contracts on Current's data network. Purchase data, which may correspond to a purchase event, can comprise the amount of the purchase, SKU data, the brand of the item or service, demographic data, and the like.

EXAMPLES

Example 1

Individual User

A new Current user downloads the Current application and sets up their PIPs profile. Within their PIPs profile elect to share their age, gender, High School and Instagram account with brands. Every time a brand accesses that information to build a cohort they user is rewarded with PIPs. In addition, over time the user receives specific offers from brands via push notifications and through location-based proximity alerts.

Example 2

Local Merchant

A local pizza restaurant wants to improve sales volume in the afternoon. They purchase 10,000 PIPs at a cost of $200 from the desktop portal and assign them to their specific store location identification within the platform. They then create an incentive that awards PIPs in varying amounts depending upon the time of purchase. For every $1 spend at the location between 7:00 p.m. and 10:00 p.m. the user receives one PIP. For every $1 spent after school, between 3:00 p.m. and 6:00 p.m., however, a user is awarded 10 PIPs. The incentive is promoted to Current users living in the local school district, and users who approach within 50 years of the location receive a real-time notification featuring the offer. The merchant can limit the promotion to a specific duration, for example three months, and end or renew the promotion. They can leave the promotion open-ended. Or they can end the promotion when the PIPs at that their location run out.

Example 3

Large CPG Brand

A large consumer brand wants to stimulate sales and gain share in a specific market. The brand has no retail locations, it sells only through distributors, and wants to do a drive sales by increasing brand awareness. They purchase 100,000 PIPs at a cost of $2,000 from the desktop portal and assign them to a specific event. The brand contracts with an in-market radio station to host a free concert. Within the system they 'place' the 100,000 PIPs inside the concert venue using geolocation. The PIPs are scheduled to be active only during the duration of the concert. Any user who is within 50 yards during the concert is eligible to claim $200 PIPs.

Example 4

Clothing Retailer

A boutique clothing retailer wants to create and then market to a lookalike audience of 5,000 Current users within a specific metro area. The retailer purchases 125,000 PIPS for $2,500 and then exchanges the PIPs for a cohort for 5,000 users who meet their specific criteria. In this example, the criteria includes both boys and girls, aged 14 to 17, which live in one of the five New York boroughs and have spent at least $20 at H&M, Urban Outfitters or American Eagle in the last six months. Each individual user in the cohort receives 25 PIPs. The clothing retailer then purchases another 50,000 PIPs for $1,000 and offers them as an incentive to members of the cohort for making an in-store purchase in the next 90-days. Two PIPs are rewarded for each dollar spent for up to one transaction per day on a first-come, first serve basis. In addition, each user who successfully refers another customer during the 90-day window receives 25 PIPs.

Example 5

National Consumer Electronics Brand

To move inventory ahead of new product launches over the upcoming holiday season, a consumer electronics brand purchases PIPs to reward as part of a back-to-school promotion. During the promotion, the brand offers $10 in PIPs to Current users who purchase directly from their website. With a target of 2,000 incremental unit sales during the promotion, the brand purchases 1,000,000 PIPs for $20,000. At the end of the 30-day promotion, the brand has transferred 500,000 PIPs to Current users as a reward for online product purchases. The remaining balance of 500,000 is sold back to Current at the end of the promotional period.

Example 6

Hypothetical User Story 1

Paul, a 19 year old NYU student in New York City uses his Current card at a local coffee shop chain (called "Local Coffee Shop") that has a location near his dorm.

Paul's Current application gets the exchange key for the interaction and submits it to Current along with his public Ethereum wallet address. Current determines which data contract schemas in the network that this interaction conforms to.

Current's provider platform finds two valid data contracts:
1. Purchases at Local Coffee Shop
   a. Amount of the swipe
   b. Time of the swipe
   c. Age of the user
   d. Gender of the user
   e. The address of the Local Coffee Shop location
2. Purchases in New York City
   a. Amount of the swipe
   b. Time of the swipe
   c. Age of the user
   d. Gender of the user
   e. Category of the purchase Current encodes the data of the purchase into both of these schemas, and encrypts them with a combination of Paul's public wallet address, the data contract address, and the exchange key. Current then posts this encrypted string to a public database to get back a data address for each string submitted.

Current returns to Paul the two data addresses paired with data signatures, and the data contract addresses they can be submitted to. Paul chooses to submit only to the purchasers at Local Coffee Shop data contract, and submits his data address to earn data tokens.

By submitting and redeeming this data address, Paul has made the information about his purchase available for purchase on Current's data network.

Example 7

User Story 2

Local Coffee Shop sees the impact that the data token rewards have had on its sales at it's other locations. More people are buying coffee there because they can submit to the Purchases at Local Coffee Shop Data Contract, and Local Coffee Shop wants to replicate the increased sales at their Columbia University location.

Local Coffee Shop first purchases data tokens from Current or from other users. They deposit these tokens onto Current's master data contract.

Local Coffee Shop then calls the "addReward" function on the master data contract to transfer data tokens from their balance to the balance of the purchasers at Local Coffee Shop Data Contract.

Users like Paul get a push notification from Current letting them know that rewards have been added for purchases at Local Coffee Shop. The only way to earn these tokens is to spend at Local Coffee Shop and submit the verified interactions to the master data contract.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

Example 8

Photo Sharing Application

A provider may be a photo sharing platform. A user interaction on that photo sharing platform includes uploading a photo to the platform. When a user posts a photo, they can get the exchange key for that post.

This provider may set up a single data contract from every user on their system, and the schema of these data contracts would accept the base64 string encoding of images.

When a user submits their exchange key to publish their photo, the provider encrypts the photo and uploads it to a public database. The photo is then purchasable on the provider's data network by anyone who wants it, and the content creator is paid every time the data is purchased by other users.

The invention claimed is:
1. A system for providing public access to encrypted data comprising:
   at least one computer processor;
   a provider;
   a public database;
   a provider private database;
   wherein a user interacts with the provider that generates user data;
   wherein the provider stores a record of the interaction;
   wherein the provider creates a secret exchange key, and makes the secret exchange key available to the user;
   wherein the system executes an authenticated request by the user for the secret exchange key;

wherein the user submits the secret exchange key and the user's public address;

wherein the provider validates the secret exchange key;

wherein, upon validating the secret exchange key, the provider finds at least one data contract that can accept the user data and provides the user a proof grant for a data contract of the at least one data contract;

wherein the provider encrypts the user data and associates the user data with the at least one data contract that can accept the user data;

wherein, upon receiving, from the provider, the proof grant for the data contract of the at least one data contract that can accept the user data, the user submits the proof grant to the data contract of the at least one data contract to the provider;

wherein, upon receipt of the user's submission of the proof grant to the data contract of the at least one data contract, the provider makes the user data associated with the data contract of the at least one data contract available for purchase by a purchaser; and wherein the system permits the user to unpublish the user data from the data contract of the at least one data contract and make the user data unavailable for future purchasing by another purchaser.

2. The system of claim 1 wherein the data is encrypted with a master wallet.

3. The system of claim 2, further comprising a user wallet created by the provider platform.

4. The system of claim 3, wherein the user wallet has a user wallet data token balance.

5. The system of claim 1, further comprising a provider application programming interface, wherein the provider application programming interface executes the authenticated request for the exchange key.

6. The system of claim 1, further comprising a hash function.

7. The system of claim 1, further comprising a public unauthenticated application programming interface, wherein the public unauthenticated application programming interface accepts the submitted exchange key.

8. The system of claim 1, further comprising selling the user data to a purchaser.

9. The system of claim 8, wherein the purchaser is permitted to view all data available for sale on a master data contract.

10. The system of claim 9, wherein the purchaser funds the master data contract with data tokens.

11. The system of claim 10, wherein the purchaser calls a purchase function on the master data contract using a purchaser interface.

12. The system of claim 11, wherein the purchaser user interface is an application.

13. The system of claim 11, further comprising an exchange key retrieval operation wherein the exchange key retrieval operation comprises:

mapping the exchange key to a data address; and wherein the provider recreates the decryption key.

14. The system of claim 13, wherein the provider returns the decryption key to the purchaser.

15. The system of claim 14, further comprising decrypted user data, wherein the purchaser uses the decryption key to decrypt the user data at the data address.

16. The system of claim 1, further permitting the user to post additional information wherein the additional information is selected from the group consisting of pictures, SKU information, geographic location, and combinations thereof.

17. A method using the system of claim 1.

18. The system of claim 1, further permitting the user to delete the user data from the data contract of the at least one data contract.

19. The system of claim 13, further permitting the user to unpublish the data address.

20. The system of claim 1, further comprising a master data contract created by the provider platform, the master data contract including the data contract of the at least one data contract.

21. The system of claim 20, further permitting the user to unpublish the user data from the master data contract.

22. The system of claim 20, further permitting the user to delete the user data from the data contract of the at least one date contract and the master data contract.

23. The system of claim 1, wherein, upon receipt of the user's submission of the proof grant for the data contract of the at least one data contract, the system rewards the user with a data token of a predetermined amount for at least one of the user's submission of the proof grant for the data contract of the at least one data contract and the purchase of the user data associated with the data contract of the at least one data contract by the purchaser.

24. The system of claim 23, wherein the system permits the user to unpublish the user data associated with the data contract of the at least one data contract and make the user data at least one of unavailable to the purchaser and unavailable for purchasing by future purchasers by paying back to the provider, from the user, the data token of the predetermined amount which was rewarded to the user at a time of the at least one of the user's submission of the proof grant for the data contract of the at least one data contract and the purchase of the user data associated with the data contract of the at least one data contract by the purchaser.

25. The system of claim 1, wherein, upon validating the secret exchange key, the provider finds a plurality of data contracts that can accept the user data and provides the user a proof grant for each data contract of the plurality of data contracts;

wherein the provider encrypts the user data and associates the user data with each data contract of the plurality of data contracts that can accept the user data;

wherein, upon receiving, from the provider, the proof grant for each data contract of the plurality of data contracts that can accept the user data, the user submits to the provider the proof grant to each selected data contract of the plurality of data contracts for which the user selects to be made available for purchase;

wherein, upon receipt of the user's submission of the proof grant to each selected data contract of the plurality of data contracts for which the user selects to be made available for purchase, the provider makes the user data associated with each selected data contract of the plurality of data contracts available for purchase by one or more purchasers.

26. The system of claim 25, wherein, upon receipt of the user's submission of the proof grant to each selected data contract of the plurality of data contracts for which the user selects to be made available for purchase, the system rewards the user with a data token of a predetermined amount for at least one of the user's submission of each proof grant and the purchase of the user data associated with each selected data contract of the plurality of data contracts by the purchaser.

27. The system of claim 26, wherein the system permits the user to selectively unpublish the user data associated with one or more selected data contracts of the plurality of data contracts and make the user data at least one of unavailable to the purchaser and unavailable for purchasing by future purchasers by paying back to the provider, from the user, the data token of the predetermined amount rewarded to the user at a time of the at least one of the user's submission of each proof grant and the purchase of the user data associated with the one or more selected data contracts of the plurality of data contracts by the purchaser.

* * * * *